US006656641B1

(12) United States Patent
Kumar

(10) Patent No.: US 6,656,641 B1
(45) Date of Patent: Dec. 2, 2003

(54) METHODS OF ENHANCING CONDUCTIVITY OF A POLYMER-CERAMIC COMPOSITE ELECTROLYTE

(75) Inventor: Binod Kumar, Dayton, OH (US)

(73) Assignee: University of Dayton, Dayton, OH (US)

( * ) Notice: Subject to any disclaimer, the term of this patent is extended or adjusted under 35 U.S.C. 154(b) by 179 days.

(21) Appl. No.: 09/755,693

(22) Filed: Jan. 5, 2001

Related U.S. Application Data

(63) Continuation-in-part of application No. 09/605,179, filed on Jun. 28, 2000, now Pat. No. 6,190,806, which is a continuation of application No. 09/136,640, filed on Aug. 19, 1998, now Pat. No. 6,132,905.
(60) Provisional application No. 60/056,465, filed on Aug. 21, 1997.

(51) Int. Cl.⁷ .................................................. H01M 6/18
(52) U.S. Cl. .................. 429/305; 429/317; 429/231.95; 252/62.2
(58) Field of Search ................................ 429/188, 189, 429/304–306, 317, 320, 323, 231.95; 252/62.2

(56) References Cited

U.S. PATENT DOCUMENTS

| | | | |
|---|---|---|---|
| 4,049,881 A | | 9/1977 | Rao et al. |
| 4,818,643 A | * | 4/1989 | Cook et al. .................. 429/188 |
| 5,217,827 A | * | 6/1993 | Fauteux et al. ............ 252/62.2 |
| 5,314,765 A | | 5/1994 | Bates |
| 5,576,115 A | | 11/1996 | Capuano et al. |
| 5,695,873 A | | 12/1997 | Kumar et al. |
| 5,728,489 A | | 3/1998 | Gao et al. |

OTHER PUBLICATIONS

Golodnitsky et al. ( "A new approach to the understanding of ion transport in semicrystalline polymer electrolytes", Journal of Electroanalytical Chemistry, 491 (Sep. 8, 2000) pp. 203–210 and abstract).*

Kumar et al. ("Polymer–ceramic composite electrolytes: conductivity and thermal history effects", Solid State Ionics 124 (1999) pp. 239–254). No month available.*

Skaarup et al., "Mixed Phase Solid Electrolytes", Solid State Ionics, 28–30 (1988) pp. 975–978 (No Month Available).

Capuano et al., "Composite Polymer Electrolytes", J. Electrochem.Soc., vol. 138, No. 7, Jul. 1991 pp. 1918–1922.

Phipps et al., Effect of Composition and Imperfections on Ion Transport in Lithium Iodide, Solid State Ionics 5 (1981) pp. 393–396 (No Month Available).

Krawiec et al., Polymer nanocomposites: a new strategy for synthesizing solid electrolytes for rechargeable lithium batteries, Journal of Power Sources 54 (1995) pp. 310–315 (No Month Available).

* cited by examiner

Primary Examiner—Susy Tsang-Foster
(74) Attorney, Agent, or Firm—Killworth, Gottman, Hagan & Schaeff, L.L.P.

(57) ABSTRACT

Methods for enhancing conductivity of polymer-ceramic composite electrolytes are provided which include forming a polymer-ceramic composite electrolyte film by a melt casting technique and uniaxially stretching the film from about 5 to 15% in length. The polymer-ceramic composite electrolyte is also preferably annealed after stretching such that it has a room temperature conductivity of from $10^{-4}$ S $cm^{-1}$ to $10^{-3}$ S $cm^{-1}$. The polymer-ceramic composite electrolyte formed by the methods of the present invention may be used in lithium rechargeable batteries.

18 Claims, 4 Drawing Sheets

METHODS OF ENHANCING CONDUCTIVITY OF A POLYMER-CERAMIC COMPOSITE ELECTROLYTE

CROSS REFERENCE TO RELATED APPLICATIONS

This application is a continuation-in-part of U.S. application Ser. No. 09/605,179, filed Jun. 28, 2000, now U.S. Pat. No. 6,190,806, which is a continuation of U.S. application Ser. No. 09/136,640, filed Aug. 19, 1998, now U.S. Pat. No. 6,132,905, which claims the benefit of U.S. provisional application Ser. No. 60/056,465, filed Aug. 21, 1997.

BACKGROUND OF THE INVENTION

The present invention relates to polymer-ceramic composite electrolytes for use in rechargeable lithium batteries, and more particularly, to methods of making a polymer-ceramic composite electrolyte which result in enhanced conductivity.

Widespread interest has existed in the use of solid electrolytes for use in lithium chargeable batteries and other high-energy-density power sources such as electrochromic devices and electrochemical sensors. A number of dielectric materials such as polymers, glasses, ceramics, and combinations thereof, are useful as solid electrolytes.

In recent years, polymer-ceramic composite electrolytes have generated particular interest for use in lithium batteries due to their high ionic conductivity. Polymer-ceramic composite electrolytes are a sub-class of solid polymer electrolytes which are formed by incorporating a ceramic material such as $Al_2O_3$, $LiAlO_2$, $SiO_2$, or zeolite in the polymer matrix. The incorporation of such ceramic materials results in enhanced conductivity, cationic transport number, and electrode-electrolyte interfacial stability.

To a large extent, the power and energy densities of a lithium battery are determined by the conductivity of the electrolyte. While polymer-ceramic composites have been developed which exhibit conductivities of about $10^{-4}$ S $cm^{-1}$, it would be desirable to further enhance conductivity to increase the power and energy densities of lithium batteries.

Accordingly, there is still a need in the art for a polymer-ceramic composite electrolyte for use in lithium batteries and other electrochemical applications which may be easily manufactured and which exhibits high conductivity.

GOVERNMENT RIGHTS

The Government has rights in this invention pursuant to Contract No. F33615-93-C-2350 awarded by the United States Air Force Department of Energy and Contract No. C-77899-J awarded by NASA Glenn (account number 93373).

SUMMARY OF THE INVENTION

The present invention meets those needs by providing methods of forming polymer-ceramic composite electrolytes in which the resulting electrolyte exhibits enhanced conductivity. In one method, the electrolyte is mechanically stretched to achieve enhanced conductivity. We have found that the effect of mechanical stretching on conductivity is permanent and stable even after long isothermal stabilization. In another method, the polymer-ceramic composite electrolyte is formed by a melt-casting method which results in enhanced conductivity. The resulting polymer-ceramic composite electrolytes may be used in a variety of electrochemical applications, particularly lithium rechargeable batteries.

According to one aspect of the present invention, a method for enhancing conductivity of a polymer-ceramic composite electrolyte is provided comprising uniaxially stretching the polymer-ceramic composite electrolyte. Preferably, the polymer-ceramic composite electrolyte is stretched at a temperature of about 45 to 55° C. The polymer-ceramic composite electrolyte is preferably in the form of a thin film which is stretched from about 5 to 15% in length. The film is preferably about 1 to 100 μm thick.

After stretching, the film has a room temperature conductivity of the order of about $10^{-6}$ S $cm^{-1}$ to $10^{-4}$ S $cm^{-1}$. By room temperature conductivity, it is meant that the film exhibits high conductivity at temperatures ranging from about −40° to 40° C.

In one embodiment of the invention, the polymer-ceramic composite electrolyte comprises from about 30 to 70% by weight poly(ethylene oxide) (PEO), from about 10 to 20% by weight of a lithium compound selected from lithium tetrafluoroborate ($LiBF_4$) or lithium methyl fluorosulfonate ($LiCF_3SO_3$), and from about 0.1 to 40% by weight of a ceramic material selected from the group consisting of $BaTiO_3$, $TiO_2$, $MgO$, $ZnO$, $SrO$, $BaO$, $CaO$, $ZrO_2$, $Al_2O_3$, $SiO_2$, $SiC$, $Si_3N_4$, and BN. More preferably, the electrolyte comprises from about 5 to 25% by weight of the ceramic material, and most preferably, about 20% by weight. The ceramic material preferably has an average particle size of about 5 to 100 nm.

In a preferred embodiment of the invention, the film is preferably annealed after stretching such that it has a room temperature conductivity of the order of about $10^{-4}$ S $cm^{-1}$ to $10^{-3}$ S $cm^{-1}$.

In an alternative embodiment of the invention, a method of enhancing conductivity of a polymer-ceramic electrolyte is provided which includes providing an amount of poly(ethylene oxide), a lithium compound selected from lithium tetrafluoroborate and lithium methyl fluorosulfonate, and a ceramic material to form a mixture, melting the mixture, and forming the mixture into a polymer-ceramic electrolyte film. Preferably, the film is also uniaxially stretched to result in a room temperature conductivity of $10^{-4}$ S $cm^{-1}$ to $10^{-3}$ S $cm^{-1}$. The stretched film is also preferably annealed to further enhance conductivity.

The polymer-ceramic composite electrolytes formed by the methods of the present invention have been found to exhibit excellent conductivity, and they may be effectively used in lithium rechargeable batteries and other electrochemical devices.

Accordingly, it is a feature of the present invention to provide methods of forming polymer-ceramic composite electrolytes for use in lithium batteries having enhanced conductivity. This, and other features and advantages of the present invention will become apparent from the following detailed description, the accompanying drawings, and the appended claims.

DETAILED DESCRIPTION OF THE PREFERRED EMBODIMENT

Figure 1:
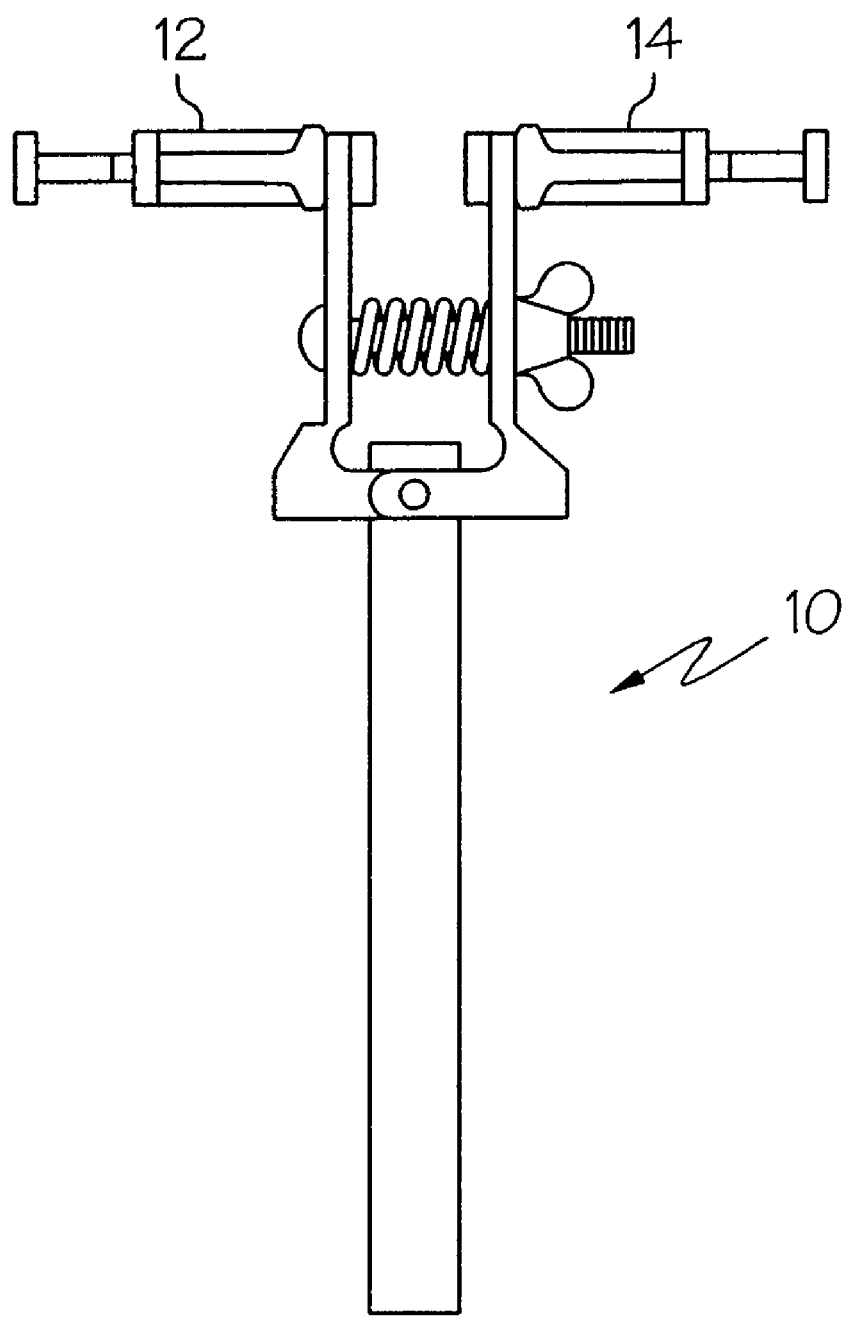
FIG. 1 is a perspective view of a mechanical stretching device in accordance with the present invention.

The polymer-ceramic composite electrolytes formed by the stretching and melt-casting methods of the present invention exhibit significantly enhanced conductivity. We have found that polymer-ceramic composite electrolytes have a dipolar structure, and that the mechanical force of stretching orients the polymer and ceramic dipoles which results in enhanced conductivity. In addition, the aligned dipolar structures formed by stretching are permanent and stable even after long isothermal stabilization. The enhancement in conductivity is related to the degree of elongation. We have found that a peak in conductivity occurs around 10% elongation.

We have also found that by forming the polymer-ceramic composite by a melt-casting method, enhanced high temperature conductivity is achieved. In the present invention, both stretching and melt-casting techniques are preferably performed to achieve optimum conductivity.

In the polymer-ceramic composite electrolyte, the polymer component, poly(ethylene oxide), preferably comprises from about 30% to 70% by weight of the composite and is available from Aldrich Chemical, for example. The lithium compound preferably comprises lithium tetrafluoroborate or lithium methyl fluorosulfonate, and preferably comprises from about 10 to 20% by weight of the composite. These compounds are also available from Aldrich Chemical. Preferably, the ratio of oxygen to lithium in the poly (ethylene oxide) and lithium complex is maintained at about 8:1. The ceramic material preferably comprises from about 0.1 to 40% by weight of the composite, and may comprise $BaTiO_3$, $TiO_2$, $MgO$, $ZnO$, $SrO$, $BaO$, $CaO$, $ZrO_2$, $Al_2O_3$, $SiO_2$, $SiC$, $Si_3N_4$, and $BN$. Preferred ceramic materials are $BaTiO_3$, $TiO_2$, and $MgO$.

The ceramic materials used in the present invention are preferably present in an amount of 5 to 25% by weight of the composite, and most preferably, about 20% by weight. The ceramic material is preferably in the form of a powder having an average particle size of about 5 to 100 nm. We have found that low temperature conductivity of the resulting electrolyte is enhanced by using ceramic materials having nanosize particles. The size of the ceramic particles is critical as we have found that larger particles, when incorporated in the polymer matrix, will remain randomly oriented and contribute little to conductivity through dipolar alignment.

The polymer-ceramic composite electrolyte may be made by a solvent casting or melt casting technique. In the solvent casting technique, the composite is made using reagent grade poly(ethylene oxide) (PEO) and the preferred lithium compound. A solution of PEO and the lithium compound is prepared in analytical grade acetonitrile. The ceramic material is dispersed in the solution, preferably using a sonicator. The homogenized solution is then cast onto a Teflon® block into thin films, which are subsequently dried to obtain films of about 100 $\mu$m in thickness.

In the melt casting technique, poly(ethylene oxide) (PEO) and the lithium compound are dry mixed with the ceramic material. The components are then melted at a temperature of about 200 to 230° C. The components are then homogenized by impeller mixing and then cooled and pressed into a film of about 100 $\mu$m in thickness. We have found that the melt casting technique offers a significant advantage in that the film may be prepared in about 2 to 3 hours compared to about 3 days when using the solvent casting method.

Regardless of the method used to prepare the polymer-ceramic composite electrolyte film, the film is preferably stretched uniaxially. Any conventional mechanical or electromechanical devices may be used to achieve the desired elongation. An example of a suitable mechanical device is a two-prong clamp 10 as illustrated in FIG. 1 where the film is stretched between tubing clamps 12 and 14.

The stretched film is then preferably annealed to further enhance conductivity. We have found that annealing the film at a temperature of from 60° to 100° C. for periods ranging from 12 to 72 hours results in a significant increase in conductivity. It should be appreciated that the aforementioned annealing temperatures and times may be varied so as to optimize the resulting conductivity. Factors that affect annealing conditions include the melting point of poly (ethylene oxide) (68° C.), the volume fraction of the ceramic material, and the thickness of the electrolyte film. After annealing, the polymer-ceramic composite electrolyte film has a room temperature conductivity of the order of about $10^{-4}$ S cm$^{-1}$ to $10^{-3}$ S cm$^{-1}$. We have found that, after annealing, the stretched film has a greater conductivity than a corresponding annealed film which has not been stretched.

In order that the invention may be more readily understood, reference is made to the following examples, which are intended to be illustrative of the invention, but are not intended to be limiting in scope.

EXAMPLE 1

PEO:LiBF$_4$—MgO and PEO:LiCF$_3$SO$_3$—MgO composite electrolyte films were made by a solvent casting technique using reagent grade poly(ethylene) oxide (PEO), lithium tetrafluoroborate (LiBF$_4$) or lithium methyl fluorosulfonate (LiCF$_3$SO$_3$), and nanosize magnesium oxide (MgO). The [O]:[Li] ratio of the polymer complex was 8:1 and the average particle size of MgO was 19 nm. A solution of PEO (Union Carbide, mol. wt. 2,000,000) and LiBF$_4$ or LiCF$_3$SO$_3$ in AR grade acetonitrile (Aldrich) was prepared in which MgO was dispersed and sonicated. After sonication, a homogenized colloidal solution was obtained which was cast and dried into a film of about 75 $\mu$m thickness.

The dried films were mechanically stretched at 50° C. in a dry box using a hand-made mechanical stretcher. The films were uniaxially stretched from 5 to 15% in length.

An ac impedance measurement was carried out (perpendicular to the stretching direction) using an EG&G impedance spectrometer model 398 in the frequency range of 0.1 Hz to 100 kHz on stainless steel(ss)/composite electrolyte/ss cells. The cells were contained in a glass vessel which was heated in an environmental chamber that allowed a temperature dependence measurement in the −40 to 100° C. range.

Figure 2A:
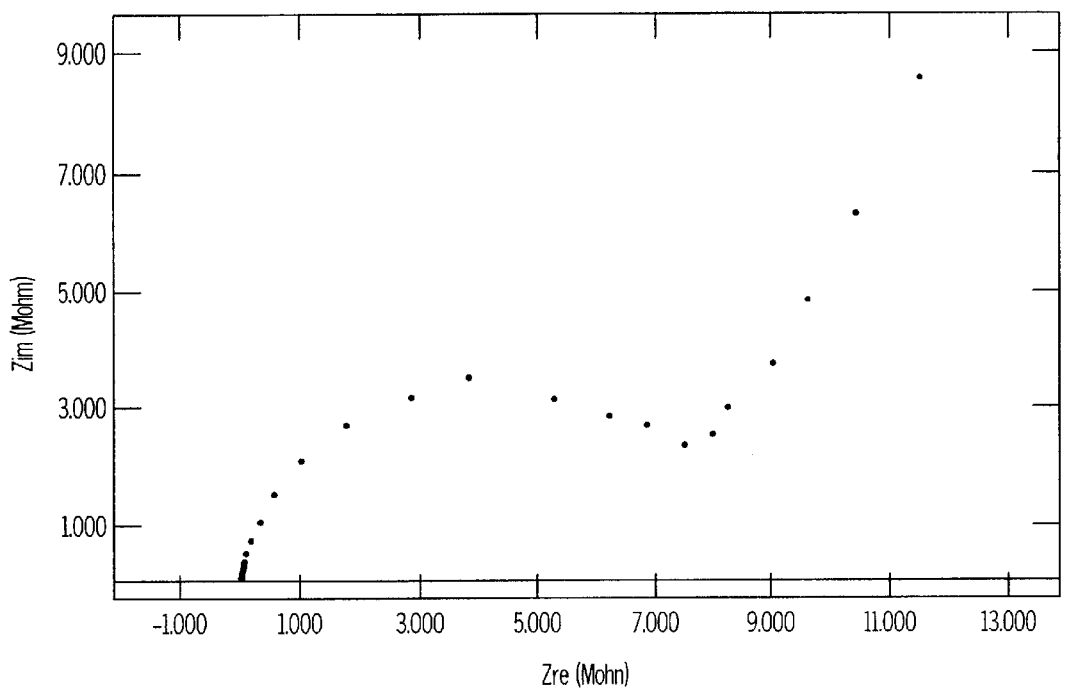
FIGS. 2A and 2B illustrate ac impedance spectra for a PEO:$LiCF_3SO_3$—MgO electrolyte before and after stretching.
Figure 2B:
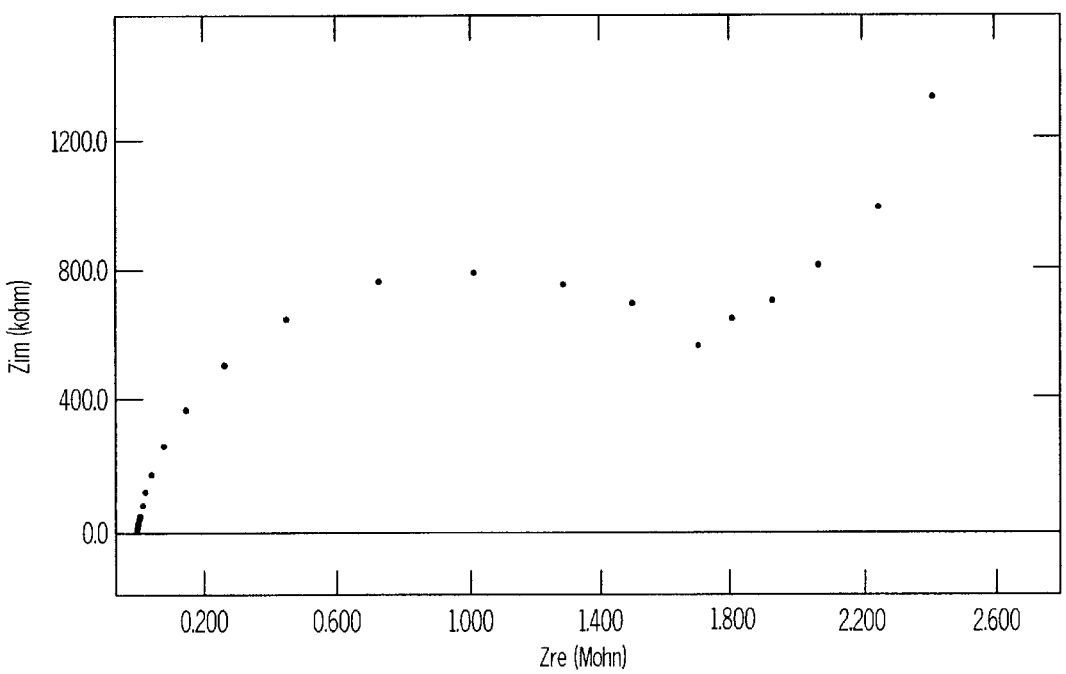

The ac impedance spectra of the PEO:LiCF$_3$SO$_3$—MgO specimen prior to and after uniaxial mechanical stretching at 26° C. are shown in FIGS. 2A and 2B. The measurement was conducted without any prior heat treatment of the films. A comparison of the two spectra shows that the resistance of the composite electrolyte film after stretching decreased from 8×10$^6$ to 1.8×10$^6$ ohm. Thus, the resistance of the electrolyte was reduced by a factor of almost 5 while the thickness of the film decreased by only 15%.

Figure 3:
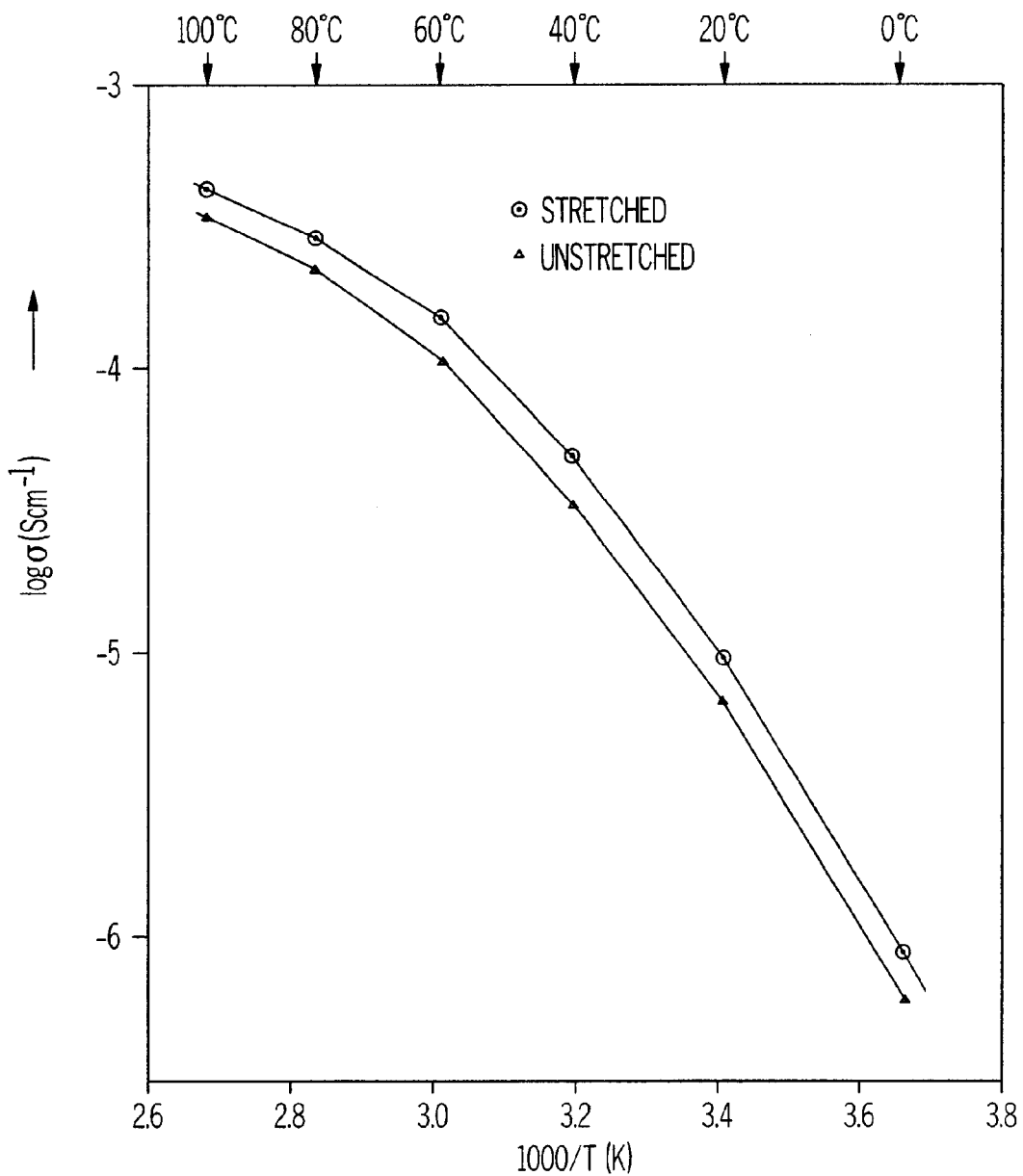
FIG. 3 is a graph illustrating the temperature dependence of conductivity for a PEO:$LiCF_3SO_3$—MgO electrolyte film after annealing.

The temperature dependence of conductivity (inverse of resistance normalized by geometrical parameters of the film) is shown in FIG. 3. The cells containing the two specimens were contained in a controlled atmosphere glass vessel. The two specimens were thermally stabilized and characterized simultaneously. The total thermal stabilization time at 60° C. was 132 hours which is believed to be sufficient to stabilize the structure of the composite electrolytes. It is noted that in spite of the long annealing time, the conductivity of the stretched specimen remained about 40% greater than the unstretched specimen over the entire temperature range. Thus, the effect of mechanical stretching on conductivity is permanent and complimentary to the effects rendered by isothermal stabilization.

Figure 4:
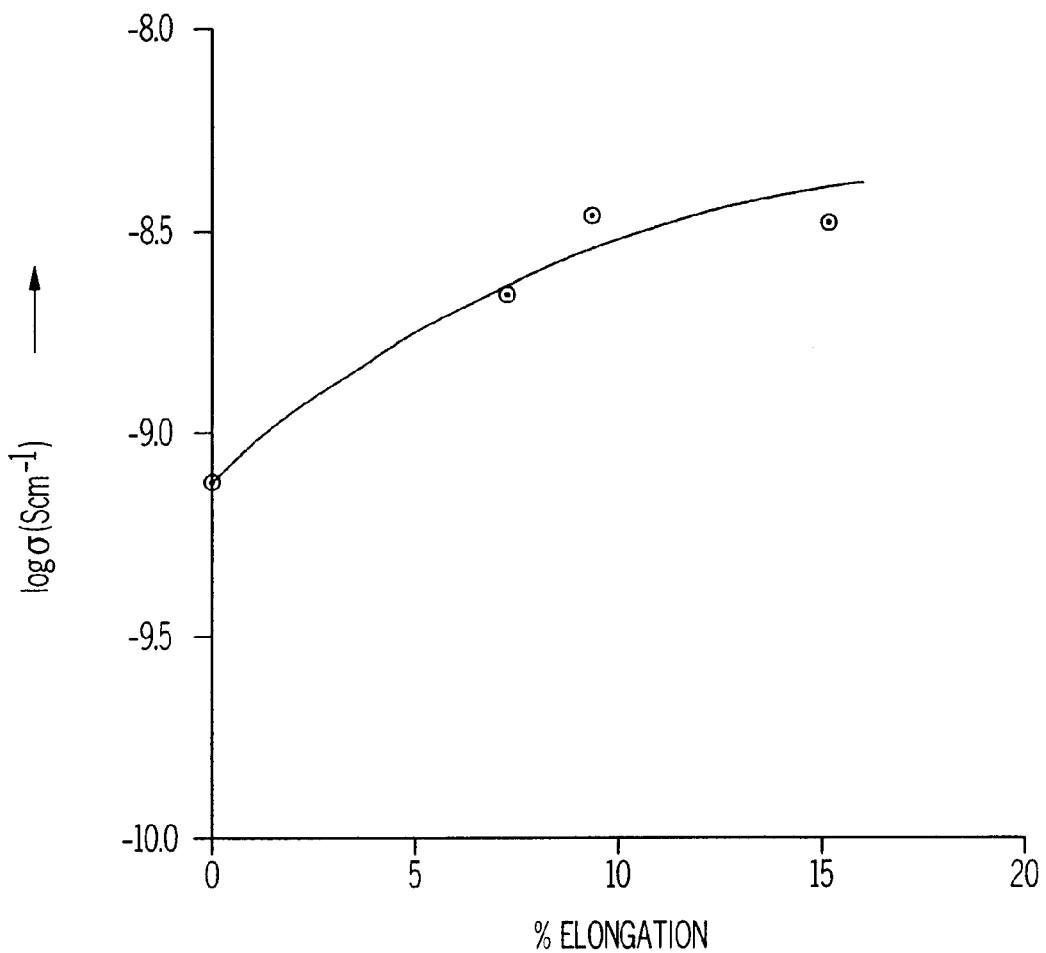
FIG. 4 is a graph illustrating the relationship between electrolyte conductivity and elongation.

FIG. 4 illustrates the relationship between measured conductivity and percent elongation. As shown, the conductivity of the electrolyte at 26° C. increases with elongation up to about 10%.

EXAMPLE 2

A PEO:LiBF$_4$ (8:1)—BaTiO$_3$ (10 wt %) electrolyte was prepared by a melt casting technique in accordance with the present invention. The raw materials PEO, LiBF$_4$ and BaTiO$_3$ were mixed, melted in a beaker on a hot plate at a temperature between about 100 to 120° C. for about 30 minutes. A small fraction of the molten mixture was then pressed between two Teflon® sheets. The thickness of the film was approximately 400 $\mu$m.

Electrochemical measurements were carried out using an EG&G impedance spectrometer model 398.

Table 1 below illustrates the conductivity data of melt and solution cast specimens of PEO:LiBF$_4$(8:1)—BaTiO$_3$ (10 wt %). As can be seen, the high temperature conductivity of the superior to that of the solution cast specimen.

TABLE 1

| PEO:LiBF$_4$ (8:1) - BaTiO$_3$ (10 wt. %) | Solution Cast | Melt Cast |
|---|---|---|
| Processing time | 3 days | 4 hours |
| Solvent | Acetonitrile | None |
| Temperature (° C.) | Conductivity (m S cm$^{-1}$) | |
| 100 | 1.09 | 3.54 |
| 80 | 0.65 | 2.08 |
| 60 | 0.29 | 0.93 |
| 40 | 0.08 | 0.19 |
| 20 | 0.02 | 0.03 |
| 0 | 0.002 | 0.002 |
| -20 | 0.00005 | 0.00004 |

EXAMPLE 3

PEO:LiBF$_4$—MgO and PEO:LiBF$_4$—BaTiO$_3$ composite electrolyte films were made by a melt casting technique using reagent grade Union Carbide (mol. wt. 2,000,000) poly(ethylene oxide) (PEO), lithium tetrafluoroborate (LiBF$_4$), magnesium oxide (MgO), and barium titanate (BaTiO$_3$). The [O]:[Li] ratio of the polymer complex 8:1. The mean particles sizes of MgO used were 20 nm and 5 $\mu$m. Barium titanate materials with mean particles sizes of 70 nm and 1 $\mu$m were used. The nano-size MgO and BaTiO$_3$ were obtained from Nanophase Technologies Corporation. The micro-size MgO and BaTiO$_3$ were obtained from Aldrich and Ferro Corporation, respectively. The melt casting process included mixing the three components in solid particle forms, melting at about 200° C. for 15 minutes, and homogenizing with an electrically-driven impeller. The process yielded a bulk preform that was subsequently used to make thin specimens ($\approx$150 $\mu$m thick) using a film-maker. The melt casting and film making operations were conducted in a dry box.

The ac impedance measurement was carried out using an EG&G impedance spectrometer Model 398 in the frequency range of 0.1 Hz to 100 kHz on stainless steel (ss)/composite electrolyte/ss cells. The cells were contained in a dry atmosphere glass vessel which was heated in an environmental chamber that allowed a temperature dependence measurement in the −40 to 100° C. range. The set temperature was maintained within ±1° C.

It was found that the highest conductivity values were associated with the specimens containing nano-size MgO and nano-size BaTiO$_3$. Room temperature conductivities of the specimens were around 10$^{-4}$ S cm$^{-1}$. It can be concluded that reducing the particle size from micro- to nano-size range increases low-temperature conductivity and decreases temperature dependence. These enhancements are also associated with lower activation energies for the lithium transport.

While certain representative embodiments and details have been shown for purposes of illustrating the invention, it will be apparent to those skilled in the art that various changes in the methods and apparatus disclosed herein may be made without departing from the scope of the invention, which is defined in the appended claims.

What is claimed is:

1. A method for enhancing conductivity of a polymer-ceramic composite electrolyte comprising uniaxially stretching said polymer-ceramic composite electrolyte, wherein said polymer-ceramic composite electrolyte comprises poly (ethylene oxide), a lithium compound, and a ceramic material.

2. The method of claim 1 wherein said polymer-ceramic composite electrolyte is stretched at a temperature of about 45 to 55° C.

3. The method of claim 1 wherein said polymer-ceramic composite electrolyte comprises from about 30 to 70% by weight poly(ethylene oxide), from about 10 to 20% by weight of said lithium compound, wherein said lithium compound is selected from the group consisting of lithium tetrafluoroborate and lithium fluorosulfonate, and from about 0.1 to 40% by weight of said ceramic material, wherein said ceramic material is selected from the group consisting of BaTiO$_3$, TiO$_2$, MgO, ZnO, SrO, BaO, CaO, ZrO$_2$, Al$_2$O$_3$, SiO$_2$, SiC, Si$_3$N$_4$, and BN.

4. The method of claim 1 wherein said polymer-ceramic electrolyte comprises from about 5 to 25% by weight of said ceramic material.

5. The method of claim 1 wherein said polymer-ceramic composite electrolyte comprises about 20% by weight of said ceramic material.

6. The method of claim 3 wherein said ceramic material has an average particle size of about 5 to 100 nm.

7. The method of claim 1 wherein said polymer-ceramic composite electrolyte is in the form of a film.

8. The method of claim 7 including forming said polymer-ceramic electrolyte into a film by melt-casting prior to stretching.

9. The method of claim 1 wherein said polymer-ceramic composite electrolyte has a room temperature conductivity of the order of about 10$^{-6}$ S cm$^{-1}$ to 10$^{-4}$ S cm$^{-1}$.

10. The method of claim 1 wherein said film is stretched from about 5 to 15% in length.

11. The method of claim 1 including annealing said film.

12. The method of claim 11 wherein said annealed film has a room temperature conductivity of the order of about 10$^{-4}$ S cm$^{-1}$ to 10$^{-3}$ S cm$^{-1}$.

13. The method of claim 7 wherein said film is about 1 to 100 $\mu$m thick.

14. A lithium rechargeable battery containing the polymer-ceramic composite electrolyte formed by the method of claim 1.

15. A method of enhancing conductivity of a polymer-ceramic composite electrolyte comprising:

a) providing an amount of poly(ethylene oxide), a lithium compound, and a ceramic material to form a mixture;

b) melting said mixture and forming said mixture into a polymer-ceramic electrolyte film; and c) uniaxially stretching said film.

16. The method of claim 15 wherein said mixture comprises from about 30 to 70% by weight poly(ethylene oxide), from about 10 to 20% by weight of said lithium compound, and from about 0.1 to 40% by weight of said ceramic material, wherein said ceramic material is selected from the group consisting of $BaTiO_3$, $TiO_2$, MgO, ZnO, SrO, BaO, CaO, $ZrO_2$, $Al_2O_3$, $SiO_2$, SiC, $Si_3N_4$, and BN.

17. The method of claim 15 wherein said polymer-ceramic electrolyte film has a room temperature conductivity of $10^{-4}$ S $cm^{-1}$ to $10^{-3}$ S $cm^{-1}$.

18. The method of claim 15 including annealing said film.

* * * * *